July 28, 1959
G. F. GARCIA ET AL
2,896,997
AUTOMOTIVE VEHICLE BODY
Filed July 3, 1957
2 Sheets-Sheet 1
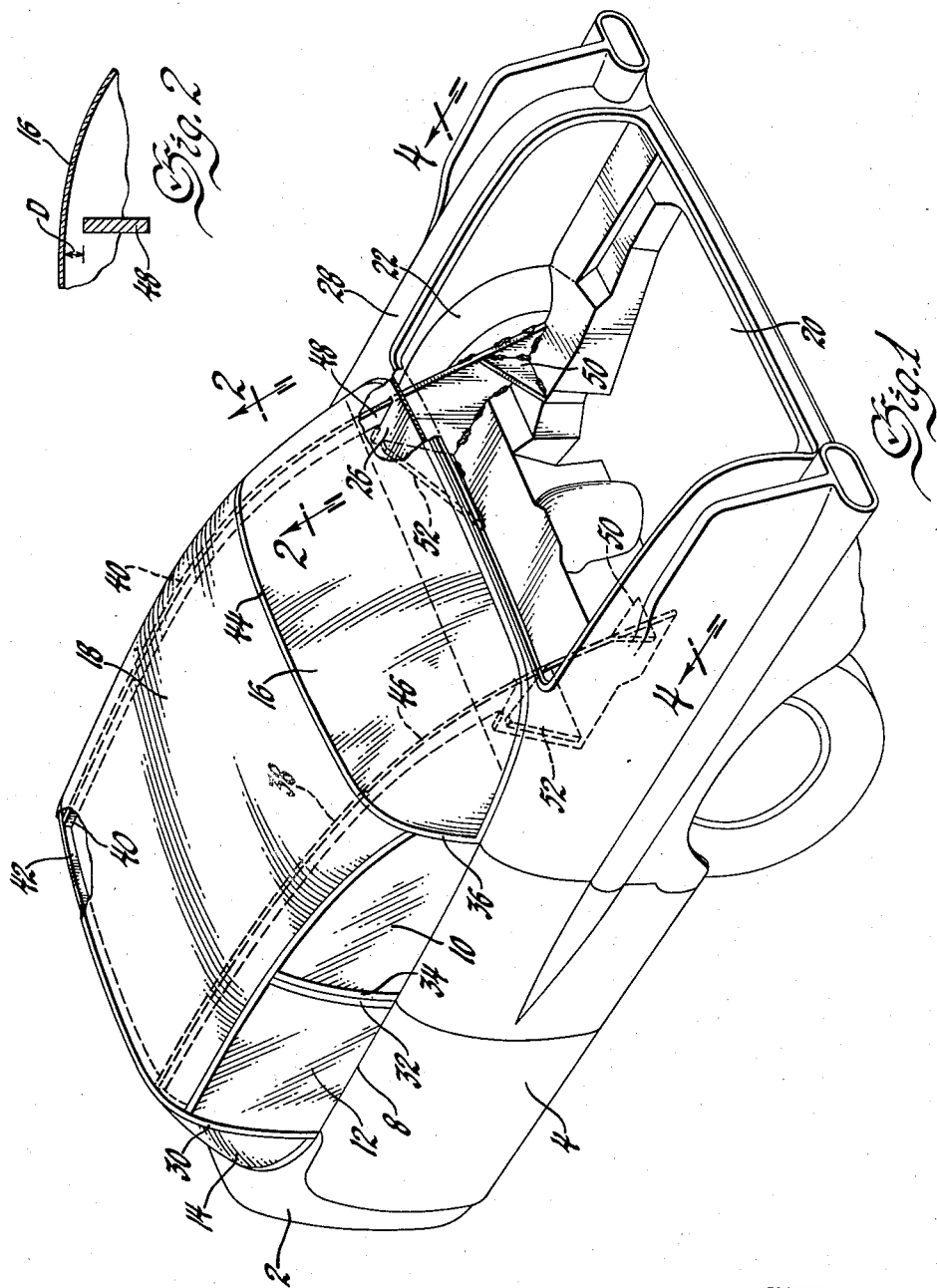
INVENTORS
Gelasio F. Garcia &
Joseph R. Schemansky
BY
ATTORNEY

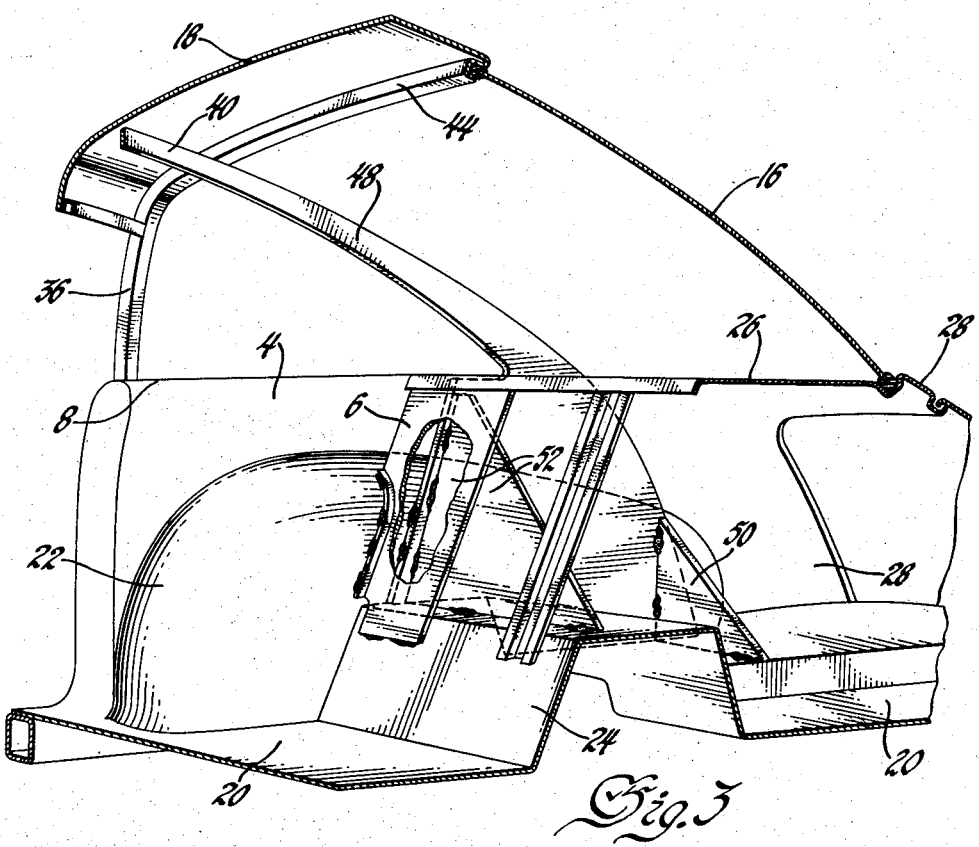
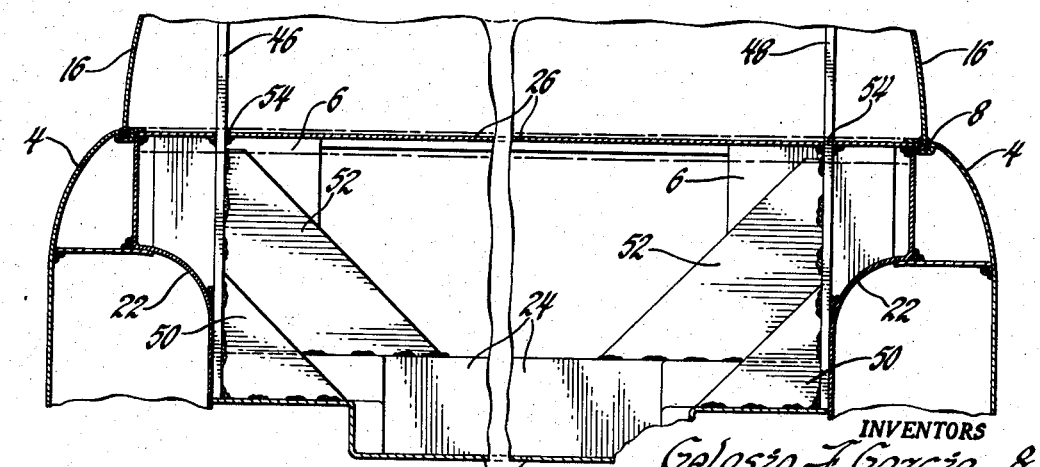

United States Patent Office 2,896,997
Patented July 28, 1959

2,896,997

AUTOMOTIVE VEHICLE BODY

Gelasio F. Garcia, Detroit, and Joseph R. Schemansky, Birmingham, Mich., assignors to General Motors Corporation, Detroit, Mich., a corporation of Delaware Application July 3, 1957, Serial No. 669,871

5 Claims. (Cl. 296—28)

This invention relates to automotive vehicles, and particularly to body constructions therefor of the type having virtually the entire front, side and rear wall portions between the roof and belt line of glass or equivalent transparent material.

A very definite trend in modern vehicle body design for both automobiles and truck cabs is toward increasing the window area between the roof and the lower opaque structural parts of the body below the belt line, both with the object of improving occupant visibility and the general external appearance of the vehicle. Important steps in this direction have been the narrowing of body front and rear roof pillars, and the elimination of the side center pillars as in the so-called "hard-top" automobiles. The result sought by designers in this effort might be characterized as that of presenting as nearly as possible a "glass house effect" with respect to the upper portion of the body passenger compartment. The more the roof-to-belt line connecting tie members can be reduced in size or emphasis, the greater is the effect of lightening the appearance of the roof and the over-all upper portion of the body.

A further significant step in this respect is accomplished in accordance with our invention by providing the sole support of the roof rearwardly of the windshield in the form of longitudinally extending beam means having the rearward vertical extending portion thereof spaced interiorly of the passenger compartment from the side and rear windows defining the upper rear quarter of the body periphery. This enables eliminating all interruptions in the transparent continuity of the body periphery between the belt line and the roof except for only those relatively thin sections constituted by the weatherstripping and guide channels for the sliding windows. Adequate anchorage of this roof supporting means to the body structure below the belt line is afforded by rigidly connecting it to the rear wheelhousing and/or floor, package shelf, etc. The roof supporting means may be designed as full cantilever type beams, having no front corner pillar connections to the belt line at the sides of the windshield, or such front corner pillars may be retained in reduced section for added stability.

The invention will be more clearly understood from the following description, having reference to the drawings wherein:

Figure 1 is a perspective partial view of an automotive passenger car vehicle showing the general arrangement of a body constructed in accordance with the invention.

Figure 2 is a fragmentary sectional view taken substantially on line 2—2 of Figure 1 showing the inboard spaced relation of the roof supporting means to the window pane in the upper rear quarter section of the body.

Figure 3 is an enlarged fragmentary internal view of the body rear quarter section illustrating the means of anchoring the roof supporting means.

Figure 4 is a transverse sectional view of the body through the rear wheelhousings, looking toward the front of the vehicle.

Referring now in detail to the drawings, the body as shown in Figure 1 includes conventional opaque front, side and rear lower walls 2, 4 and 6, which extend below the belt line indicated at 8. Above the belt line the side walls are formed by the side windows 10, 12, front window or windshield 14 and rear window 16. The body roof 18, together with these opaque and transparent side walls, and the body floor 20 which interconnect the lower side walls (Figure 4), define the usual passenger compartment for the driver and occupants. The rear wall 6 as best shown in Figure 3 forms the support for the rear seats (not shown) and is connected at its sides as by welding to the body lower side walls 4 and their reinforcing wheelhousing portions 22. The lower end of this rear wall 6 similarly anchors to the kick-up portion 24 of the floor panel 20, and the upper end of rear wall 6 connects rigidly with the usual package shelf 26 which extends rearwardly to the base of the back window 16 where it joins the body rear deck panel 28 at the belt line.

The windows 10, 12, 14 and 16 are in close edge-to-edge relation being separated by opaque stiles 30, 32, 34, 36 of minimum section required for conventional weatherstripping, and guiding for vertical sliding movement in the case of the side windows 10. In the case of the aforementioned "hard-top" automobile bodies the stiles 32, 34 between the two side windows afford no support for the roof 18, these stiles being vertically movable with the side windows. However, even such "hard-top" bodies require substantial sections for supporting the roof in the vicinity of the front and rear corner stiles 30 and 36. While in accordance with our invention the front pillar or stile 30 may serve to some extent as a structural member in supporting the roof, the rear stile 36 has been relieved of this function so that it may be of only the minimum thickness necessary to carry the weatherstripping between the rear side window 10 and the rear window 16.

In accordance with the invention, the entire or main support for the roof is obtained by longitudinally extending beam means illustrated by the two transversely spaced cantilever beams 38 and 40. These may be located, as shown, just inboard from the side extremities of the roof and arranged to underlie and reinforce the roof throughout its full length from the windshield header 42 to the rear window header 44. Rearwardly of the latter, or beginning just forwardly thereof, the beams 38 and 40 extend downwardly and rearwardly into the body below the belt line.

A very important aspect of our invention lies in the fact that these rearwardly and downwardly extending beam portions 46 and 48 do not closely underlie the rear window 16, but are spaced a substantial distance D (Figure 2) interiorly of the passenger compartment from the side and rear portions of the window 16. By reason of such spacing, these beam portions 46, 48 are not readily apparent to anyone viewing the body externally from any appreciable distance, with the result that the continuity of transparency of the windowed upper portion of the body is virtually unobstructed. The aforementioned result can, of course, be made most effective by finishing the beam portions 46, 48 in a color which contrasts to a minimum extent with that of the interior lining of the roof, seats, etc.

Adequate anchorage of the beams 38, 40 to provide all necessary support for the roof is obtained by extending their portions 46, 48 below the belt line to the floor 20 and welding their lower and forward edges to the floor and passenger compartment rear wall 6, as shown. Such anchorage is supplemented by additionally welding the lower portions of these beams to the rear wheelhouse portions of the body side walls, and by suitable gusset type braces 50 and 52. Necessary apertures 54 are provided in the package shelf for the passage of the beams therethrough, and welding these beams to the shelf at these apertures serves also to augment the beam anchorage.

While only a single preferred embodiment of the invention has been disclosed, it is appreciated that numerous minor changes in the construction and arrangement of the parts may be made without departing from the spirit and scope of the invention as defined in the following claims.

We claim:

1. In an automotive vehicle body having a roof and side, front and rear windows defining substantially the entire outer periphery of the body above the belt line, longitudinally extending cantilever beam means providing the sole support for the roof rearwardly of said front window and having its free end terminating rearwardly of the front window, said beam means extending along the underside of the roof and downwardly from the rear end thereof in spaced relation interiorly of the body from said side and rear windows, whereby the supporting of said roof does not interrupt the continuity of transparency of said body periphery rearwardly of the front window, and means within the body fixedly anchoring the rearwardly and downwardly extended end of the beam means below the belt line.

2. In an automotive vehicle body of the closed type having a rigid roof and side, front and rear windows defining substantially the entire outer periphery of the body above the belt line, longitudinally extending cantilever beam means providing the sole support for the roof and having its free end terminating rearwardly of the front window, said beam means reinforcing the roof intermediate the front and rear windows and extending downwardly at its rearward end in spaced relation interiorly of the body from said side and rear windows, body side and rear walls extending below the belt line, and a body floor member interconnecting said walls, said beam means having its downwardly extending rear end fixedly anchored to said floor and walls.

3. In an automotive vehicle body of the closed type having upper and lower side, front and rear walls extending above and below the belt line, respectively, and a roof and floor defining a passenger compartment, all of said upper walls consisting of transparent panels with narrow vertical side edge reinforcing sections in close side-by-side relation for presenting the appearance of a virtually unobstructed transparent enclosure for the portion of said compartment disposed between the roof and belt line of the body, and means defining the sole structural support for the roof relative to said floor and lower side and rear walls, said means consisting of a pair of longitudinally extending cantilever beams secured to the underside of the roof and having their forward ends terminating rearwardly of the body front upper wall, the rearward ends of said beams extending downwardly from the roof to the belt line in spaced relation interiorly of the body from said panels and connecting fixedly with the body lower side walls.

4. In an automotive vehicle body of the closed type having upper and lower side, front and rear walls extending above and below the belt line, respectively, and a roof and floor defining a passenger compartment, all of said upper walls consisting of transparent panels with narrow vertical side edge reinforcing sections in close side-by-side relation for presenting the appearance of a virtually unobstructed transparent enclosure for the portion of said compartment disposed between the roof and belt line of the body, wheel housing members reinforcing said floor and body lower side and rear walls, and means defining the sole load carrying connection between the roof and the belt line of the body rearwardly of said front walls, said means consisting of laterally spaced longitudinally extending beams secured adjacent their front ends to the roof and extending downwardly and rearwardly of the roof at their rear ends to the body floor, said beams being fixedly connected to the floor and to said wheel housings and lower rear wall, said upper side and rear walls of the body being located in spaced outboard relation to the beams between the roof and belt line.

5. The invention of claim 4, together with a package shelf extending transversely of the body and rearwardly from the upper edge of said lower rear wall, said shelf having apertures through which said beams extend and being fixed to said beams at said apertures and fixed to said lower side and rear walls.

References Cited in the file of this patent

UNITED STATES PATENTS

| 2,028,143 | Carr | Jan. 21, 1936 |
| 2,626,180 | Thompson | Jan. 20, 1953 |
| 2,796,286 | Barenyi | June 18, 1957 |
| 2,798,763 | Dujic | July 9, 1957 |

FOREIGN PATENTS

| 1,062,048 | France | Dec. 2, 1953 |
| 485,982 | Italy | Oct. 22, 1953 |